US012555023B2

(12) United States Patent
Munawar et al.

(10) Patent No.: US 12,555,023 B2
(45) Date of Patent: Feb. 17, 2026

(54) REINFORCEMENT LEARNING EXPLORATION BY EXPLOITING PAST EXPERIENCES FOR CRITICAL EVENTS

(71) Applicant: INTERNATIONAL BUSINESS MACHINES CORPORATION, Armonk, NY (US)

(72) Inventors: Asim Munawar, Ichikawa (JP); Giovanni De Magistris, Kawasaki (JP); Ryuki Tachibana, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1223 days.

(21) Appl. No.: 16/009,815

(22) Filed: Jun. 15, 2018

(65) Prior Publication Data

US 2019/0385091 A1     Dec. 19, 2019

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
None
See application file for complete search history.

(56) References Cited

U.S. PATENT DOCUMENTS

| 8,494,980 B2* | 7/2013 | Hans ................. G05B 13/026 706/12 |
| 2007/0220303 A1* | 9/2007 | Kimura .............. G06F 11/0709 714/4.11 |
| 2009/0327011 A1* | 12/2009 | Petroff ................ G01C 21/343 705/5 |
| 2010/0070098 A1* | 3/2010 | Sterzing .............. G05B 13/027 700/287 |

(Continued)

OTHER PUBLICATIONS

Foerster et al, "Stabilising Experience Replay for Deep Multi-Agent Reinforcement Learning", Proceedings of the 34th International Conference on Machine Learning, Sydney, Australia, PMLR 70, 2017 (Year: 2017).*

(Continued)

*Primary Examiner* — Viker A Lamardo
*Assistant Examiner* — Leah M Feitl
(74) *Attorney, Agent, or Firm* — Tutunjian & Bitetto, P.C.; Robert Richard Aragona

(57) ABSTRACT

A computer-implemented method is provided for reinforcement learning performed by a processor. The method includes obtaining, from an environment, a given experience that includes an action, a state and a reward. The method further includes storing the given experience in an experience buffer responsive to a value of the reward included in the given experience exceeding a first threshold. The method also includes responsive to obtaining another experience having another reward that less than or equal to the first threshold, searching the experience buffer for a candidate experience with a similar state to the other experience and (Continued)

copying the candidate experience into an event buffer. The method additionally includes during exploration, selecting an action to be taken to the environment from the event buffer with a predetermined probability.

15 Claims, 10 Drawing Sheets

(56) References Cited

U.S. PATENT DOCUMENTS

| | | | | |
|---|---|---|---|---|
| 2010/0094786 | A1* | 4/2010 | Gupta | G06N 20/00 |
| | | | | 706/12 |
| 2010/0318478 | A1* | 12/2010 | Yoshiike | G06K 9/00664 |
| | | | | 706/12 |
| 2012/0084237 | A1* | 4/2012 | Hasuo | G06N 3/006 |
| | | | | 706/12 |
| 2015/0100530 | A1* | 4/2015 | Mnih | A63F 13/67 |
| | | | | 706/25 |
| 2016/0232445 | A1* | 8/2016 | Srinivasan | G06N 3/0472 |
| 2017/0024346 | A1 | 1/2017 | Lillicrap et al. | |
| 2017/0032245 | A1* | 2/2017 | Osband | G06N 3/08 |
| 2017/0140269 | A1* | 5/2017 | Schaul | G06N 3/088 |
| 2018/0032082 | A1* | 2/2018 | Shalev-Shwartz | G06N 7/005 |
| 2019/0061147 | A1* | 2/2019 | Luciw | B25J 9/163 |
| 2019/0232488 | A1* | 8/2019 | Levine | B25J 9/163 |

OTHER PUBLICATIONS

Horgan et al. "Distributed prioritized experience replay." arXiv preprint arXiv:1803.00933 (2018). (Year: 2018).*

Lin, "Self-Improving Reactive Agents Based On Reinforcement Learning, Planning and Teaching", Mach Learn 8, 293-321 (1992). https://doi.org/10.1007/BF00992699 (Year: 1992).*

Gabor et al, "Multi-criteria Reinforcement Learning", Proceedings of the Fifteenth International Conference on Machine Learning (ICML 1998), Madison, Wisconsin, USA, Jul. 24-27, 1998 (Year: 1998).*

Adam et al, "Experience Replay for Real-Time Reinforcement Learning Control", IEEE Transactions on Systems, Man, and Cybernetics—Part C: Applications and Reviews, vol. 42, No. 2, Mar. 2012 (Year: 2012).*

Mnih et al. "Human-level control through deep reinforcement learning". Nature 518, 529-533 (2015). https://doi.org/10.1038/nature14236 (Year: 2015).*

Van Hasselt et al., "Deep Reinforcement Learning with Double Q-learning." arXiv preprint arXiv:1509.06461 (2015). (Year: 2015).*

Zuo et al, "Continuous reinforcement learning from human demonstrations with integrated experience replay for autonomous driving," 2017 IEEE International Conference on Robotics and Biomimetics (ROBIO), Macau, Macao, 2017, pp. 2450-2455, doi: 10.1109/ROBIO.2017.8324787. (Year: 2017).*

Hester et al. "Deep Q-learning from Demonstrations." arXiv preprint arXiv:1704.03732 (2017). (Year: 2017).*

Berkenkamp et al. "Safe Model-based Reinforcement Learning with Stability Guarantees." arXiv e-prints (2017): arXiv-1705. (Year: 2017).*

"Partially Observable Markov Decision Process" Wikipedia, modified May 24, 2018 (Year: 2018).*

Wang et al. "Sample efficient actor-critic with experience replay." arXiv preprint arXiv:1611.01224 (2017). (Year: 2017).*

Hausknecht et al. "Deep Recurrent Q-Learning for Partially Observable MDPs." arXiv preprint arXiv:1507.06527 (2015). (Year: 2017).*

Isele et al. "Selective Experience Replay for Lifelong Learning." arXiv preprint arXiv:1802.10269 (Feb. 2018). (Year: 2018).*

Andrychowicz et al. "Hindsight Experience Replay." arXiv preprint arXiv:1707.01495 (Feb. 2018). (Year: 2018).*

Szita et al., "Learning to Play Using Low-Complexity Rule-Based Policies: Illustrations through Ms. Pac-Man", Journal of Artificial Intelligence Research 30 (2007), Dec. 2007, pp. 659-684.

Śnieżyński et al., "Combining Rule Induction and Reinforcement Learning", 2010 Ninth International Conference on Machine Learning and Applications, Dec. 2010, pp. 851-856.

Geibel et al., "Risk-Sensitive Reinforcement Learning Applied to Control under Constraints", Journal of Artificial Intelligence Research 24 (2005), pp. 81-108, Jul. 2005.

Schaul et al., "Prioritized Experience Replay", arXIV:1511.05952v4 [cs.LG], pp. 1-21, Feb. 2016.

Pathak et al., "Curiosity-driven Exploration by Self-supervised Prediction", arXiv:1705.05363v1 [cs.LG], 12 pages, May 2017.

* cited by examiner

500

```
model = Sequential()
model.add(Reshape(target_shape=(10,10, 1), input_shape=(1,map_size**2)))
model.add(Convolution2D(64,(3,3),padding='same'))
model.add(Activation('relu'))
model.add(MaxPooling2D())
model.add(Convolution2D(32,(3,3),padding='same'))
model.add(Activation('relu'))
model.add(MaxPooling2D())
model.add(Flatten())
model.add(Dense(48))
model.add(Activation('relu'))
model.add(Dense(nb_actions, activation='linear'))
```

FIG. 6

- 10 x 10 Grid
- State 10x10 image
  - Agent = 1
  - Target = 2
  - Wall = 3
  - Hole = 4
- Reward
  - Move towards target: +1
  - Move away from target: -1
  - Hit wall: -2
  - Fall in hole: -10 (Episode ends)
  - Reach target: +10 (Episode ends)
- Maximum steps: 200 (Episode ends)

- Optimizer
  - Adam
  - Learning rate: 0.001
- RL Algorithm
  - Double DQN
- Learning Interval: 1
- Batch size: 32
- Warmup steps: 100

FIG. 8

REINFORCEMENT LEARNING EXPLORATION BY EXPLOITING PAST EXPERIENCES FOR CRITICAL EVENTS

BACKGROUND

Technical Field

The present invention generally relates to machine learning, and more particularly to improving reinforcement learning exploration by exploiting past experiences for critical events.

Description of the Related Art

Reinforcement learning is a machine learning technique that learns from trial and error by getting a reward from interacting with an environment(s). Typically, the goal in reinforcement learning is to find a balance between exploration (of uncharted territory) and exploitation (of current knowledge).

However, reinforcement learning can suffer from problems including, but not limited to, (i) typically requiring a lot of data to converge, (ii) being unable to solve many problems, (iii) involving a model that treats all events equally irrespective of whether or not the events are considered important, and (iv) being mostly represented as neural networks (that is, not in a human understandable format). Thus, there is a need for improved reinforcement learning.

SUMMARY

According to an aspect of the present invention, a computer-implemented method is provided for reinforcement learning performed by a processor. The method includes obtaining, from an environment, a given experience that includes an action, a state and a reward. The method further includes storing the given experience in an experience buffer responsive to a value of the reward included in the given experience exceeding a first threshold. The method also includes responsive to obtaining another experience having another reward that less than or equal to the first threshold, searching the experience buffer for a candidate experience with a similar state to the other experience and copying the candidate experience into an event buffer. The method additionally includes during exploration, selecting an action to be taken to the environment from the event buffer with a predetermined probability.

According to another aspect of the present invention, a computer program product is provided for reinforcement learning performed by a processor. The computer program product includes a non-transitory computer readable storage medium having program instructions embodied therewith. The program instructions are executable by a computer having the processor to cause the computer to perform a method. The method includes obtaining, from an environment, a given experience that includes an action, a state and a reward. The method further includes storing the given experience in an experience buffer responsive to a value of the reward included in the given experience exceeding a first threshold. The method also includes responsive to obtaining another experience having another reward that less than or equal to the first threshold, searching the experience buffer for a candidate experience with a similar state to the other experience and copying the candidate experience into an event buffer. The method additionally includes during exploration, selecting an action to be taken to the environment from the event buffer with a predetermined probability.

According to yet another aspect of the present invention, a computer processing system is provided for reinforcement learning. The computer processing system includes a memory for storing program code. The computer processing system further includes a processor, operatively coupled to the memory, for running the program code to obtain, from an environment, a given experience that includes an action, a state and a reward. The processor further runs the program code to store the given experience in an experience buffer responsive to a value of the reward included in the given experience exceeding a first threshold. The processor also runs the program code to, responsive to obtaining another experience having another reward that less than or equal to the first threshold, search the experience buffer for a candidate experience with a similar state to the other experience and copying the candidate experience into an event buffer. The processor additionally runs the program code to, during exploration, select an action to be taken to the environment from the event buffer with a predetermined probability.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 is a textual diagram of an exemplary model for reinforcement learning to which the present invention can be applied, in accordance with an embodiment of the present invention;

FIG. 7 is a textual diagram of an exemplary environment for reinforcement learning to which the present invention can be applied, in accordance with an embodiment of the present invention;

FIG. 8 is a textual diagram of exemplary hyper parameters for reinforcement learning to which the present invention can be applied, in accordance with an embodiment of the present invention;

DETAILED DESCRIPTION

Figure 1:
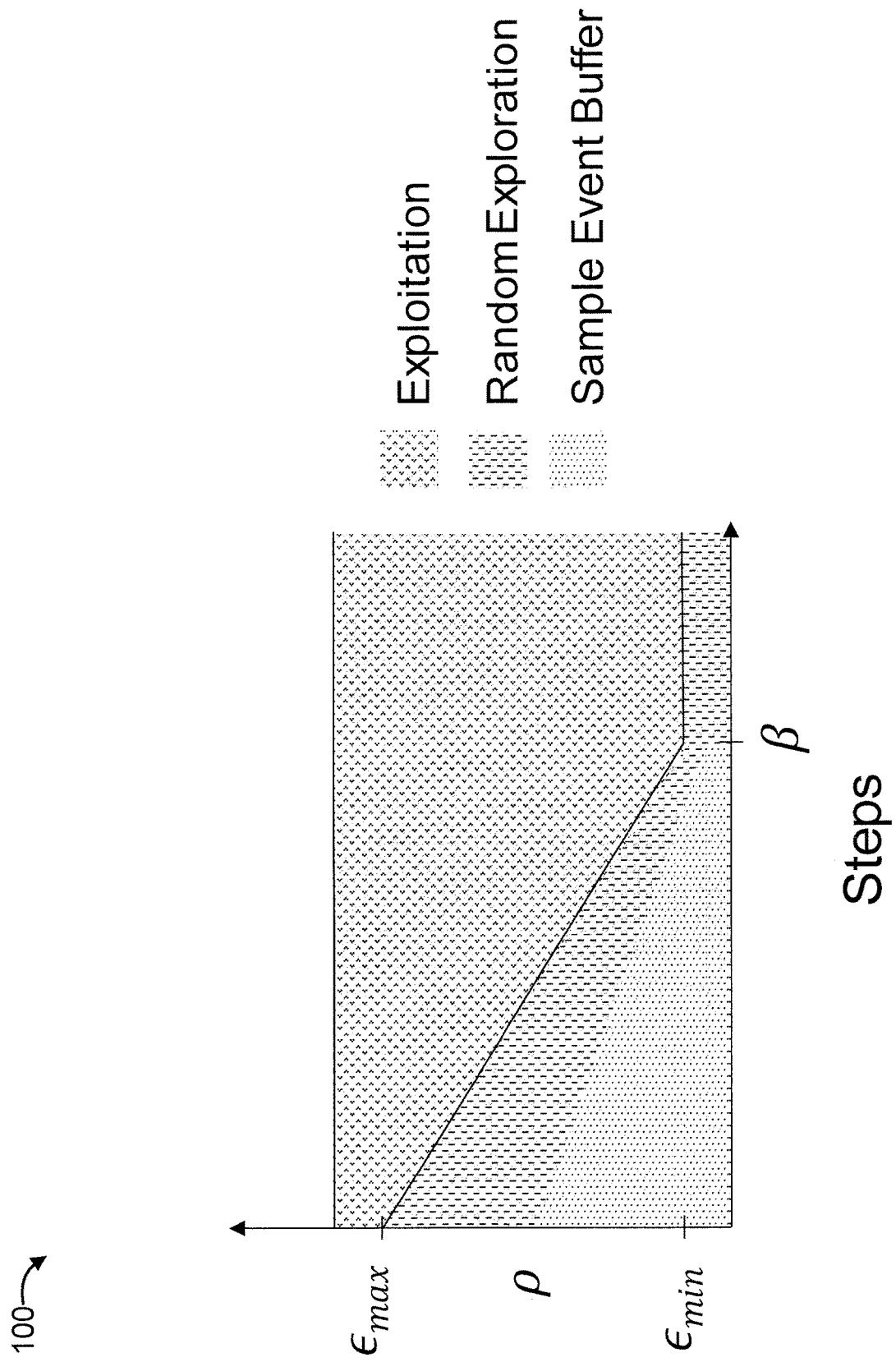
FIG. 1 is a plot showing an exemplary usage of an event buffer in exploration, in accordance with an embodiment of the present invention.

The present invention is directed to improving reinforcement learning exploration by exploiting past experiences for critical events. As used herein, the term "critical events" refer to respective sets of steps that directly or indirectly result in a reward that is well below (e.g., by a threshold amount) an average award amount. In an embodiment, steps that result in the agent dying can be considered critical events. Of course, other outcomes can be involved in critical events, depending upon the implementation.

In an embodiment, the present invention involves a training portion, an inference portion, and a network probing (during inference) portion. The network probing portion can be selectively used, depending upon the implementation.

In an embodiment, the present invention involves an experience buffer, an event buffer, and local state. The experience buffer and event buffer are used during the training portion (and are not used during the inference portion). As used herein, an experience is denoted by a triple of {state, action, reward}. The experience buffer is a memory that stores all the experiences observed earlier (as a {state, action, reward} triple), except the ones that resulted in a very low reward (that is, critical events). Hence, in an embodiment, the experience buffer can be considered to store all the experiences about non-critical events. The event buffer is a memory that stores the experiences about (known) critical events, where the agent did not die. Thus, the event buffer differs from the experience buffer in that the experience buffer stores all experiences about all non-critical events while the event buffer stores all experiences about critical events where the agent did not die. The local state is a low-dimensional representation of the agent surroundings that will directly influence the next action taken by the agent. This representation needs to be defined by the user and depends on the problem that is being solved An overview will now be given regarding the training portion, in accordance with an embodiment of the present invention.

All past experiences, except critical events (e.g., agent dies, etc.), are stored in the experience buffer. An experience is represented by a {state, action, reward} triple. As noted above, critical events are events (steps) that directly or indirectly result in a well below average reward. The state is usually the local state in a low-dimensional space where, as used herein, "low dimensional space" refers to a space having 3, 2, or less dimensions depending upon the implementation.

For any critical event, the experience buffer is searched. If an experience for a similar state exists with a better outcome (reward), then it should be copied to the event buffer.

Only the exploration is affected by the current invention. The exploitation is not affected.

During exploration, the actions from the event buffer are sampled with a fixed probability ($\rho$).

After a pre-defined number of steps ($\beta$) during training, the event buffer is no longer used, and model-free reinforcement learning is performed.

An overview will now be given regarding the network probing (during inference) portion, in accordance with an embodiment of the present invention.

All the experiences and their respective frequencies of occurrence (with reward) are stored during training. This information can be used to probe (infer) the reason why the network learned to perform some action. Moreover, this information can be used to plot experiences using the respective rewards as a weight for visualization. Of course, other networking probing functions can also be performed given the teachings of the present invention provided herein, while maintaining the spirit of the present invention.

FIG. 1 is a plot showing an exemplary usage 100 of an event buffer in exploration, in accordance with an embodiment of the present invention.

In FIG. 1, ($\rho$) denotes a probability of the sampling event buffer during exploration, ($\beta$) denotes when to stop using the event buffer (in this case, it is the maximum number of steps, $\epsilon_{min}$ denotes a minimum probability of exploration, $\epsilon_{max}$ denotes a maximum probability of exploration, N denotes a size of the experience buffer, and M denotes a size of the event buffer.

The exploitation is performed in a usual manner. During exploration, if the current state is found in the event buffer, then the actions in the event buffer are sampled with a fixed probability ($\rho$). However, after a given number of steps ($\beta$), the use of the event buffer stops but the random exploration continues. Therefore, during training, the next action is determined either by using the learned model (exploitation), or random exploration, or by sampling the actions for similar events in the event buffer.

Figure 2:
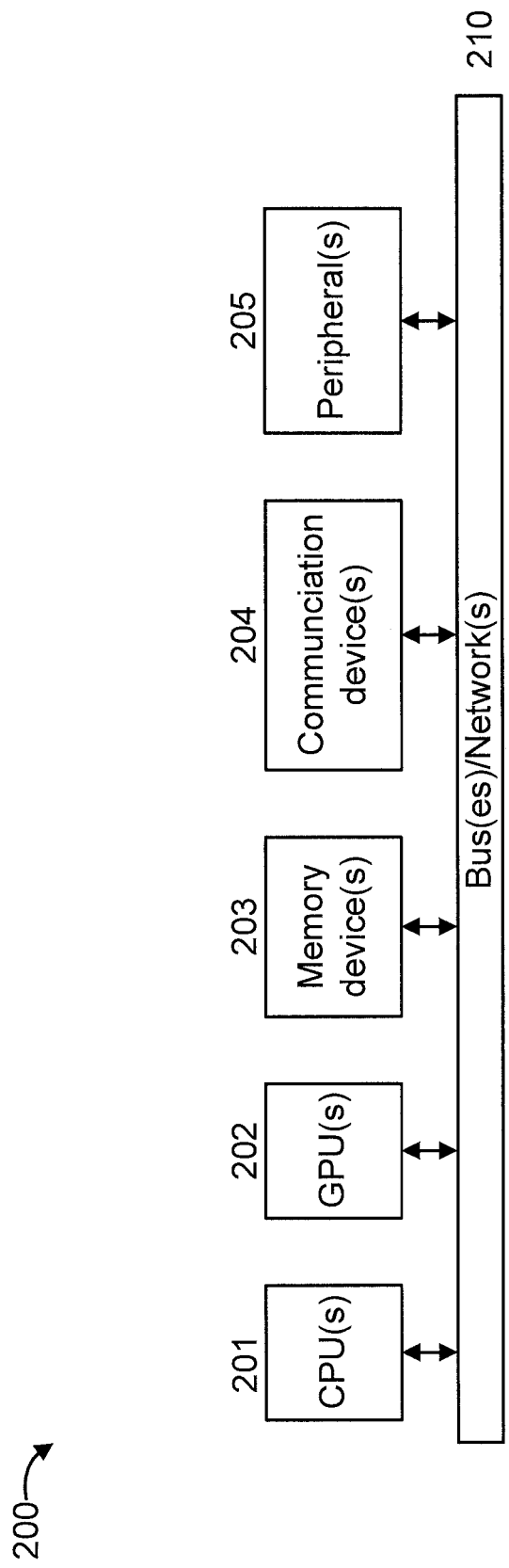
FIG. 2 is a block diagram showing an exemplary processing system to which the present invention may be applied, in accordance with an embodiment of the present invention.

FIG. 2 is a block diagram showing an exemplary processing system 200 to which the present invention may be applied, in accordance with an embodiment of the present invention. The processing system 200 includes a set of processing units (CPUs) 201, a set of GPUs 202, a set of memory devices 203, a set of communication devices 204, and set of peripherals 205. The CPUs 201 can be single or multi-core CPUs. The GPUs 202 can be single or multi-core GPUs. The one or more memory devices 203 can include caches, RAMs, ROMs, and other memories (flash, optical, magnetic, etc.). The communication devices 204 can include wireless and/or wired communication devices (e.g., network (e.g., WIFI, etc.) adapters, etc.). The peripherals 205 can include a display device, a user input device, a printer, and so forth. Elements of processing system 200 are connected by one or more buses or networks (collectively denoted by the figure reference numeral 210).

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 8-9). These and other variations of the processing system 200 are readily contemplated by one of ordinary skill in the art given the teachings of the present invention provided herein.

Figure 3:
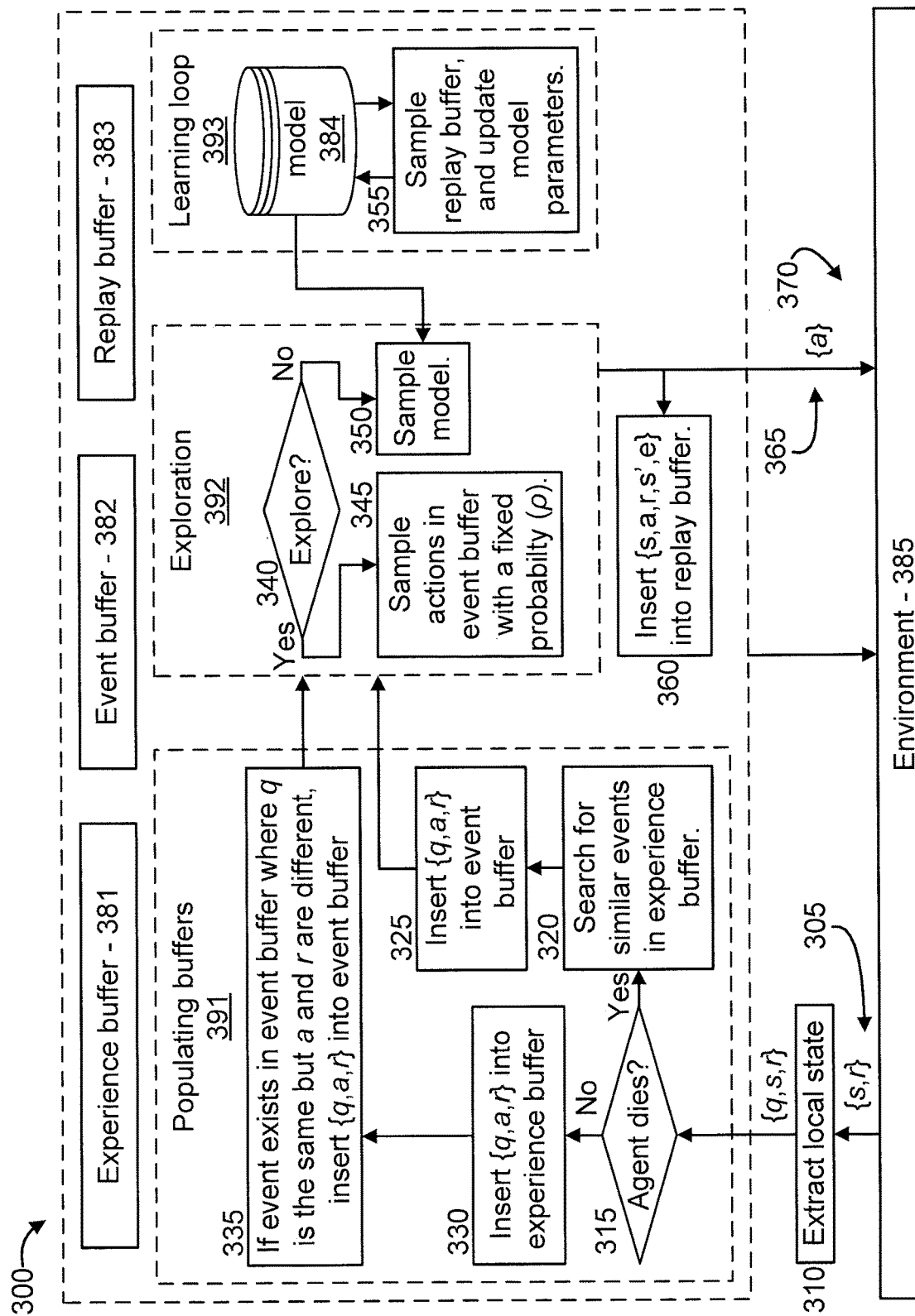
FIG. 3 is a high-level block diagram showing an exemplary method/system for improving reinforcement learning exploration by better exploiting past experiences for critical events, in accordance with an embodiment of the present invention.

Moreover, it is to be appreciated that system/method 300 described below with respect to FIG. 3 is a system for implementing respective embodiments of the present invention. Part or all of processing system 100 may be implemented in one or more of the elements of system 300.

FIG. 3 is a high-level block diagram showing an exemplary method/system 300 for improving reinforcement learning exploration by better exploiting past experiences for critical events, in accordance with an embodiment of the present invention.

The method/system 300 involves an experience buffer 381, an event buffer 382, a replay buffer 383, a model 384, and a target environment (hereinafter "environment" in short) 385. The replay buffer 383 is a commonly used construct in reinforcement learning algorithms. The replay buffer 383 stores <state, action, next state, reward and episode end flag> for all the actions.

The method/system 300 further involves a populating buffers stage 391, an exploration stage 392, and a learning loop 393. The populating buffers stage 391 involves blocks 305 through 345 described below. The exploration stage 392 involves blocks 340 through 350 described below. The learning loop 393 involves block 355 described below.

The operation of the method/system 300 will first be generally described, following by a more thorough explanation with respect to the particular blocks depicted in FIG. 3.

At every time step, the system goes from state s→s' and local state q→q' by performing an action a and getting a reward r.

Every experience {q, a, r} is inserted into the experience buffer 381, except the experiences where the agent dies (e.g., falling in the hole). If a similar event (same q) exist in the event buffer 382 with different action or reward, then this experience is also inserted into the event buffer 382.

If the agent dies and a similar experience exists in the experience buffer 381, then the similar experience is copied to event buffer 382 so that another agent (or the same agent, if revived) can survive if the other agent (or the same revived agent) faces the (same) situation at a subsequent time.

At block 305, obtain {s, r} from the environment, where s denotes a system state and r denotes a reward corresponding to system state s.

At block 310, extract a local state q from the environment 385 to obtain {q, s, r}.

At block 315, for a given experience (denoted by {local state, action, reward}, that is, {q, a, r}), determine if the agent has died. If so, then proceed to block 320. Otherwise, proceed to block 330. The condition of the agent dying can be considered a first threshold on the reward for the given experience, where if the agent has died, then the first threshold is considered to be exceeded.

At block 320, search the experience buffer 381 for similar events (to {q, a, r}) where the agent has died. A similar event to {q, a, r}, also denoted as {q, a, r}, is one where q is the same but the action a or the reward r is different.

At block 325, insert the similar events {q, a, r} where the agent has died into the event buffer 382. In this way, the system can use the information in a future scenario to help the agent or another agent survive the similar events.

At block 330, insert the experience {q, a, r} where the agent has not died into the experience buffer 381.

At block 335, if an event exists in the event buffer 382 where (i) the agent has not died, (ii) q is the same, (iii) but a or r are different, then insert the experience {q, a, r} into the event buffer 382.

At block 340, determine if exploration is to be performed. If so, then proceed to block 345. Otherwise, proceed to block 350.

At block 350, sample actions in the event buffer 382 with a fixed probability (ρ).

At block 350, sample the model 384.

At block 355, sample the replay buffer 383 and update model parameters for the model 384.

At block 360, insert {s, a, r, s', e} into the replay buffer 383, where e denotes an episode end flag.

At block 365, provide next action {a} to the environment 385. Thus, during training, the next action {a} is determined by using (i) the learned model (exploitation), or (ii) random exploration, or (iii) by sampling the actions for similar events in the event buffer 382.

At block 370, control an object in the environment based on the next action {a}. The object can be controlled to perform the next action {a} itself or can be controlled to perform another action in response to the next action {a}. The object can be an agent, a vehicle, a robot, and so forth. In the case of the object being a vehicle, the next action {a} can involve obstacle avoidance maneuvers (braking, steering) being automatically performed (by a machine, and not the vehicle operator). Of course, other types of actions can be involved such as controlling a robot to perform a particular action (to avoid something, pick up something, move something, etc.). The preceding objects and actions are merely illustrative and, thus, other objects and action can also be involved, as readily appreciated by one of ordinary skill in the art given the teachings of the present invention presented herein, while maintaining the spirit of the present invention.

It is to be appreciated that the program code for performing method 300 can be stored in a memory. Any of the buffers can be included in that memory or in a separate memory. Moreover, the buffers can be separate with respect to each other, either physically or virtually. These and other variations of the buffers in particular and of the present invention in general are readily determined by one of ordinary skill in the art given the teachings of the present invention provided herein, while maintaining the spirit of the present invention.

Figure 4:
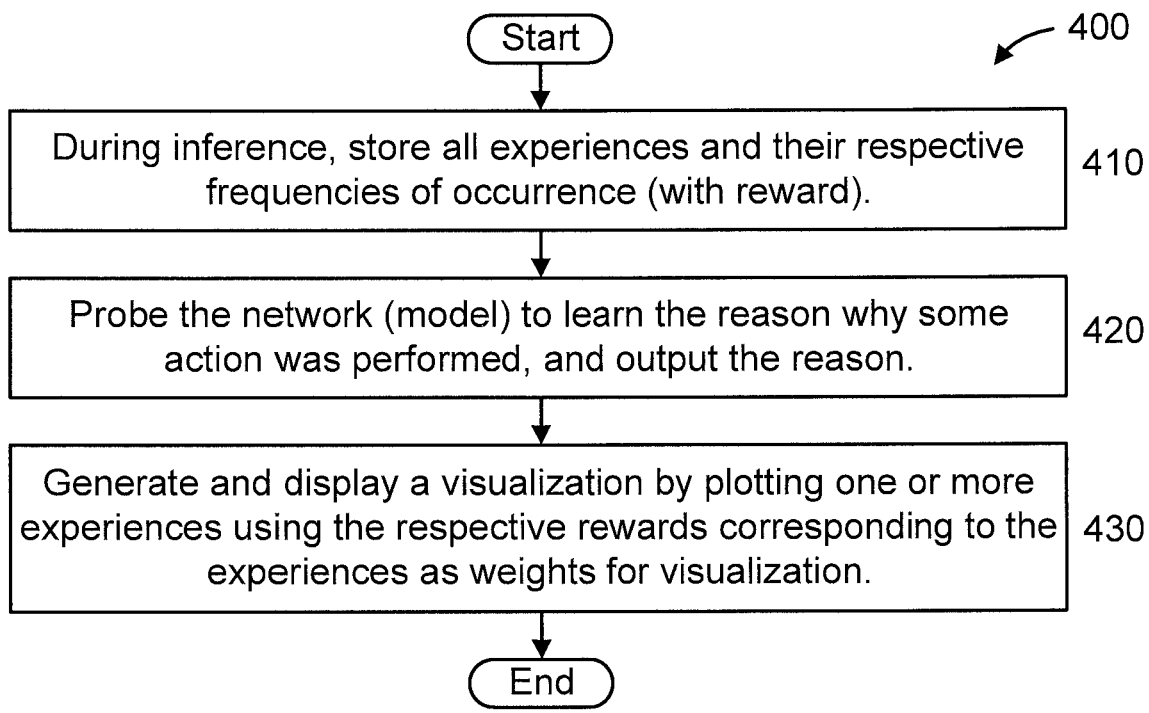
FIG. 4 is a flow diagram showing an exemplary method for network probing during inference, in accordance with an embodiment of the present invention.

FIG. 4 is a flow diagram showing an exemplary method 400 for network probing during inference, in accordance with an embodiment of the present invention.

At block 410, during inference, store all experiences and their respective frequencies of occurrence (with reward).

At block 420, probe the network (model) to learn the reason why some action was performed, and output the reason.

At block 430, generate and display a visualization by plotting one or more experiences using the respective rewards corresponding to the experiences as weights for visualization.

Figure 5:
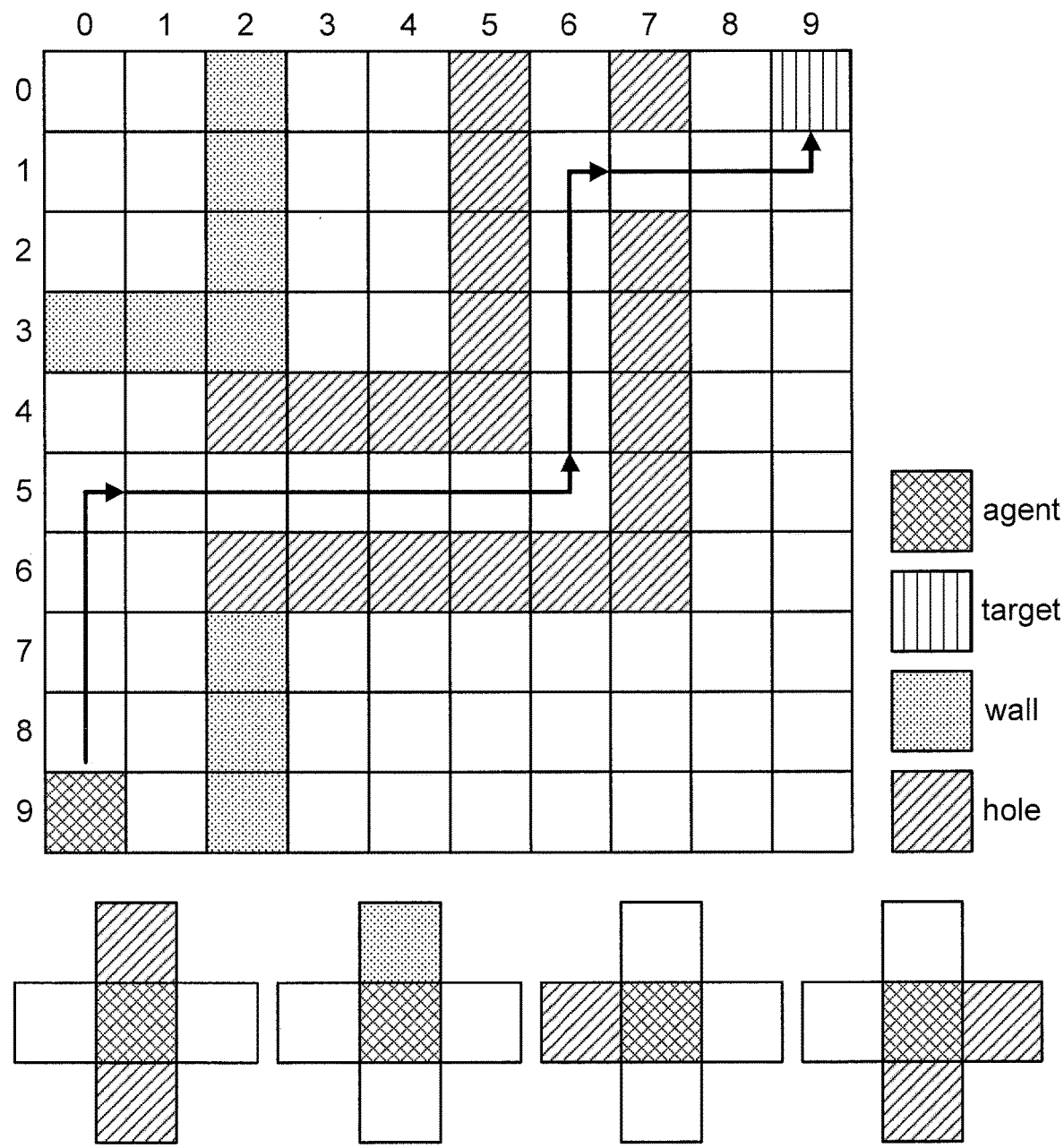
FIG. 5 is a block diagram showing various exemplary local states to which the present invention can be applied, in accordance with an embodiment of the present invention.

FIG. 5 is a block diagram showing various exemplary local states 500 to which the present invention can be applied, in accordance with an embodiment of the present invention.

The local states 500 are depicted with respect to a 10×10 grid 501 having an x-axis and a y-axis. The x-axis has a range from 0-9, and the y-axis also has a range from 0-9.

An agent, a target, walls, and holes are shown. The agent is shown using cross hatching, the target is shown using vertical line hatching, the walls are shown using dotted hatching, and the holes are shown using diagonal hatching.

The agent is initialized at (9,0). Target is at (0,9). The agent cannot go through the walls, such an action is ignored. If agent falls in the hole it dies. The local state is only the boxes on the left, right, top and bottom at the current time step. The goal is to reach the target in the minimum number of steps.

FIG. 6 is a textual diagram of an exemplary model 600 for reinforcement learning to which the present invention can be applied, in accordance with an embodiment of the present invention.

As shown, the model 600 includes various layers including, but not limited to, convolutional layers, max pooling layers, and so forth.

FIG. 7 is a textual diagram of an exemplary environment 700 for reinforcement learning to which the present invention can be applied, in accordance with an embodiment of the present invention.

As shown, the environment 700 involves a 10×10 grid, a state 10×10 image, a reward, and a maximum number of steps.

The state 10×10 image involves 1 agent, 2 targets, 3 walls, and 4 holes.

The reward can involve: moving towards the target; moving away from the target; hitting a wall; falling in a hole; and reaching the target.

In this example, the maximum number of steps is set to 200.

Of course, other values can be used for any of the preceding variables/parameters.

FIG. 8 is a textual diagram of exemplary hyper parameters 800 for reinforcement learning to which the present invention can be applied, in accordance with an embodiment of the present invention.

The hyper parameters 800 include optimizer hyper parameters, Reinforcement Learning (RL) algorithm hyper parameters, a learning interval hyper parameter, a batch size hyper parameter, and a warmup steps hyper parameter.

The optimizer hyper parameters include the Adam Optimization Algorithm which is an extension of stochastic gradient descent. The RL algorithm hyper parameters include the use of a Double DQN algorithm which combines Q learning with a deep neural network.

A description will now be given regarding some of the many attendant advantages of the present invention, in accordance with various embodiments of the present invention.

The present invention allows for virtually any kind of reinforcement learning algorithm to be able to exploit previously acquired experiences for faster convergence. In an embodiment, the experiences are: (i) previously seen states with better rewards; (ii) human demonstrations; and (iii) expert rules. Of course, other experiences can also be used in accordance with the teachings of the present invention, while maintaining the spirit of the present invention.

Inference is exactly the same as a model-free reinforcement learning.

Acquired experiences can also be used to explain system decisions in human understandable format, which is important for explainable Artificial Intelligence (AI).

A description will now be given regarding various exemplary applications to which the present invention can be applied, in accordance with various embodiments of the present invention.

For example, the present invention can be applied to robotic applications (e.g., warehouse robots, manipulators, etc.), dialog applications (e.g., customer service, etc.), plant or data center optimization, gaming applications, and so forth. It is to be appreciated that the preceding applications are illustrative and that one of ordinary skill in the art will contemplate these and various other applications to which the present invention can be applied, based on the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
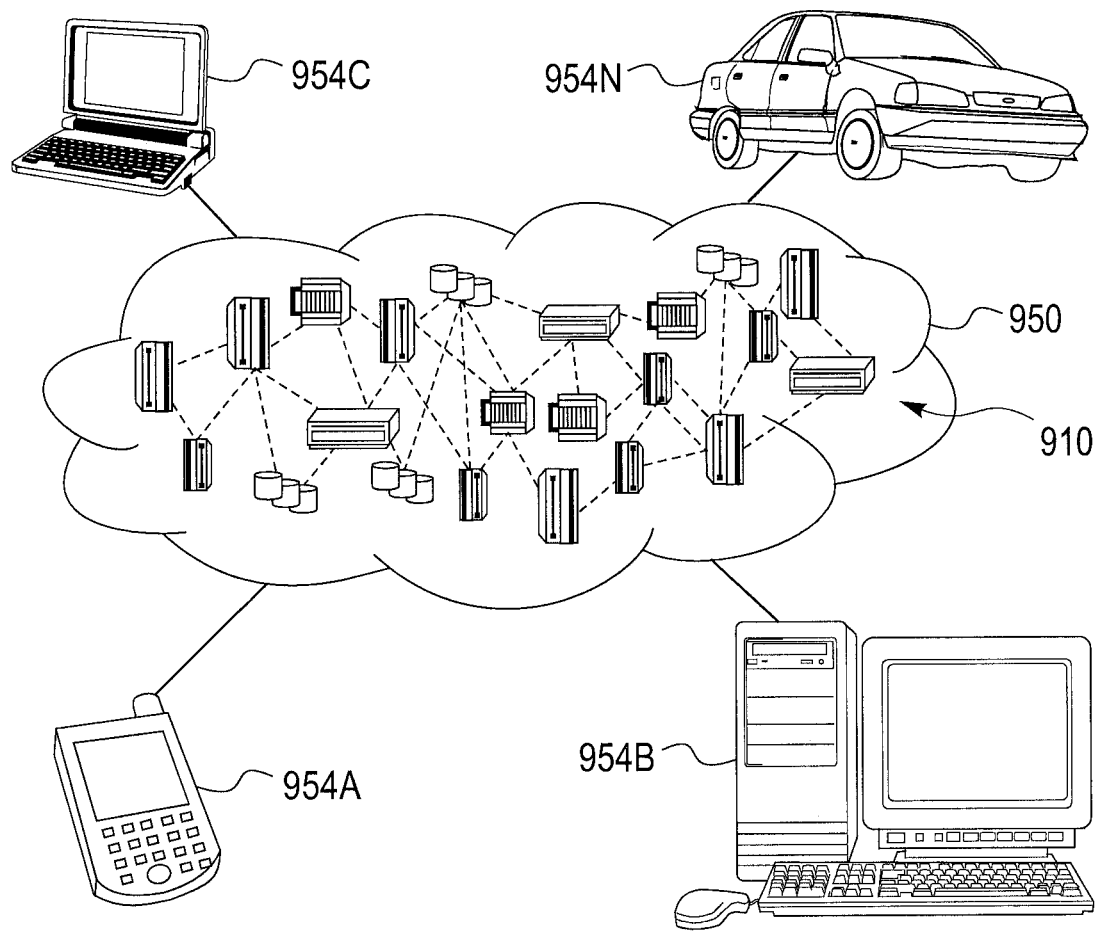
FIG. 9 is a block diagram showing an illustrative cloud computing environment having one or more cloud computing nodes with which local computing devices used by cloud consumers communicate in accordance with one embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
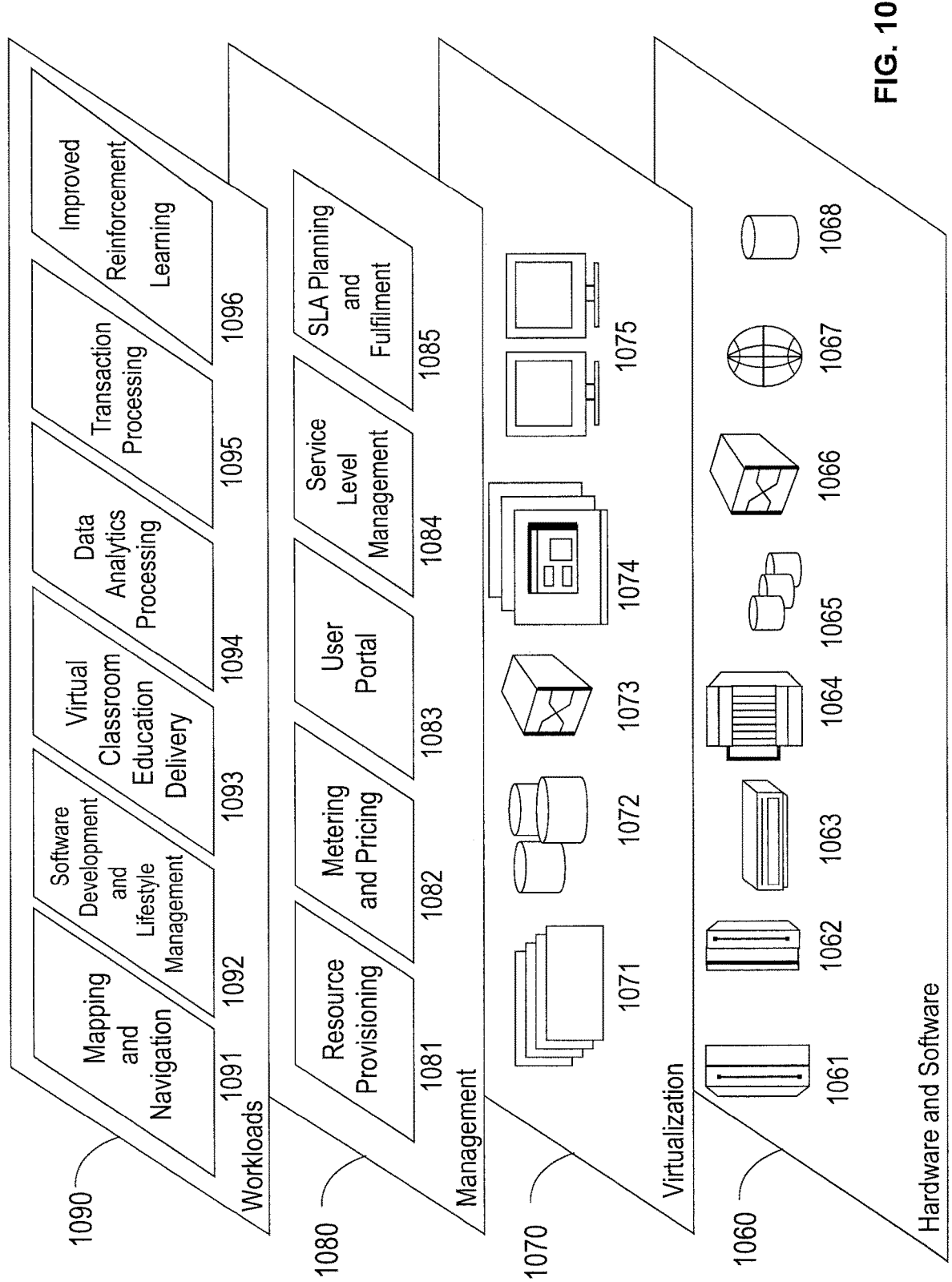
FIG. 10 is a block diagram showing a set of functional abstraction layers provided by a cloud computing environment in accordance with one embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and improved reinforcement learning exploration by exploiting past experiences for critical events 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for data determination for reinforcement learning training performed by a processor, the method comprising:
   obtaining, from an environment, a given experience that includes a vehicle action, a state and a reward;
   configuring an experience buffer and an event buffer for cooperative model training usage such that the experience buffer and the event buffer are no longer used for training after a pre-defined number of training steps and model-free reinforcement learning is performed;
   during training, storing the given experience in the experience buffer responsive to a value of the reward included in the given experience not being below an average award amount for a plurality of experiences by a first threshold amount, while excluding from the experience buffer events where an agent dies corresponding to the value of the reward included in the given experience being below the average award amount by the first threshold amount;
   further during training, responsive to obtaining another experience, searching the experience buffer for a candidate experience with a similar state but with a better reward and different vehicle action to the other experience and copying the candidate experience into the event buffer storing events where an agent survives;
   during exploration, selecting a vehicle action to be taken to the environment from the event buffer with a pre-determined probability; and
   performing the vehicle action taken from the event buffer to avoid the vehicle action becoming an event where the agent dies, the vehicle action being a controlling of a motor vehicle to perform a braking or steering action for accident avoidance.

2. The computer-implemented method of claim 1, further comprising stopping the selecting of the vehicle action from the event buffer after a pre-defined number of steps during a training stage of the reinforcement learning.

3. The computer-implemented method of claim 2, further comprising performing random exploration responsive to said stopping step.

4. The computer-implemented method of claim 1, further comprising storing in the experience buffer any experiences previously observed except for the experiences that resulted in a corresponding reward that fails to exceed the first threshold.

5. The computer-implemented method of claim 1, wherein the state represents a local state in a low-dimensional space.

6. The computer-implemented method of claim 1, wherein the method is applied to the plurality of experiences, wherein the first threshold is used to identify critical events, and wherein any of the plurality of experiences unrelated to the critical events are stored in the experience buffer and any of the plurality of experiences related to the critical events are stored in the event buffer.

7. The computer-implemented method of claim 1, further comprising plotting, on a display device, a plurality of experiences in a visualization, each of the plurality of experiences having a respective reward to form a plurality of rewards across the plurality of experiences, wherein said plotting step uses the plurality of rewards as weights for the visualization.

8. A computer program product for data determination for reinforcement learning training performed by a processor, the computer program product comprising a non-transitory computer readable storage medium having program instructions embodied therewith, the program instructions executable by a computer having the processor to cause the computer to perform a method comprising:
   obtaining, from an environment, a given experience that includes a vehicle action, a state and a reward;
   configuring an experience buffer and an event buffer for cooperative model training usage such that the experience buffer and the event buffer are no longer used for training after a pre-defined number of training steps and model-free reinforcement learning is performed;
   during training, storing the given experience in the experience buffer responsive to a value of the reward included in the given experience not being below an average award amount for a plurality of experiences by a first threshold amount, while excluding from the experience buffer events where an agent dies corresponding to the value of the reward included in the given experience being below the average award amount by the first threshold amount;
   further during training, responsive to obtaining another experience, searching the experience buffer for a candidate experience with a similar state but with a better reward and different vehicle action to the other experience and copying the candidate experience into the event buffer storing events where an agent survives;
   during exploration, selecting a vehicle action to be taken to the environment from the event buffer with a pre-determined probability; and
   performing the vehicle action taken from the event buffer to avoid the vehicle action becoming an event where the agent dies, the vehicle action being a controlling of a motor vehicle to perform a braking or steering action for accident avoidance.

9. The computer program product of claim 8, wherein the method further comprises stopping the selecting of the vehicle action from the event buffer after a pre-defined number of steps during a training stage of the reinforcement learning.

10. The computer program product of claim 9, wherein the method further comprises performing random exploration responsive to said stopping step.

11. The computer program product of claim 8, wherein the method further comprises storing in the experience buffer any experiences previously observed except for the experiences that resulted in a corresponding reward that fails to exceed the first threshold.

12. The computer program product of claim 8, wherein the state represents a local state in a low-dimensional space.

13. A computer processing system for data determination for reinforcement learning training, comprising:
   a memory for storing program code; and
   a processor, operatively coupled to the memory, for running the program code to
      obtain, from an environment, a given experience that includes vehicle action, a state and a reward;
      configuring an experience buffer and an event buffer for cooperative model training usage such that the experience buffer and the event buffer are no longer used for training after a pre-defined number of training steps and model-free reinforcement learning is performed;

during training, store the given experience in the experience buffer responsive to a value of the reward included in the given experience not being below an average award amount for a plurality of experiences by a first threshold amount, while excluding from the experience buffer events where an agent dies corresponding to the value of the reward included in the given experience being below the average award amount by the first threshold amount;

further during training, responsive to obtaining another experience, search the experience buffer for a candidate experience with a similar state but with a better reward and different vehicle action to the other experience and copying the candidate experience into the event buffer storing events where an agent survives;

during exploration, select vehicle action to be taken to the environment from the event buffer with a predetermined probability; and perform the vehicle action taken from the event buffer to avoid the vehicle action becoming an event where the agent dies, the vehicle action being a controlling of a motor vehicle to perform a braking or steering action for accident avoidance.

14. The computer-implemented method of claim 1, wherein during training, the plurality of experiences and their respective frequencies of occurrence with rewards are stored and used to plot the experiences using respective ones of the rewards as weights for visualization.

15. The computer-implemented method of claim 1, wherein during training, a next vehicle action is determined by sampling actions for similar events in the event buffer.

* * * * *